April 2, 1935.  F. H. MUELLER  1,996,346
PIPE OR ROD FITTING
Filed June 2, 1933
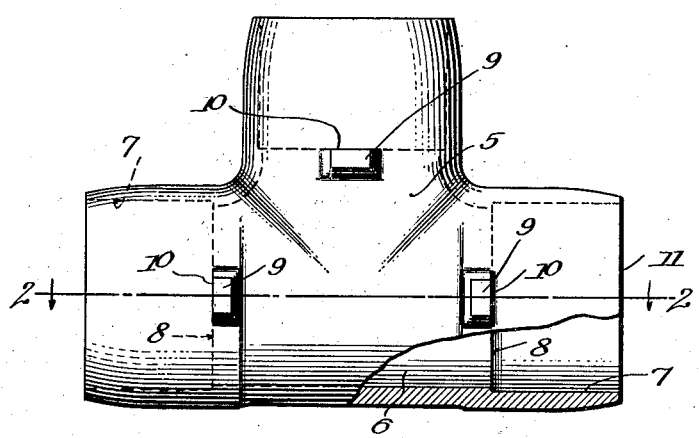
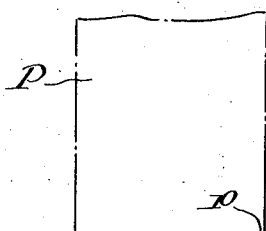
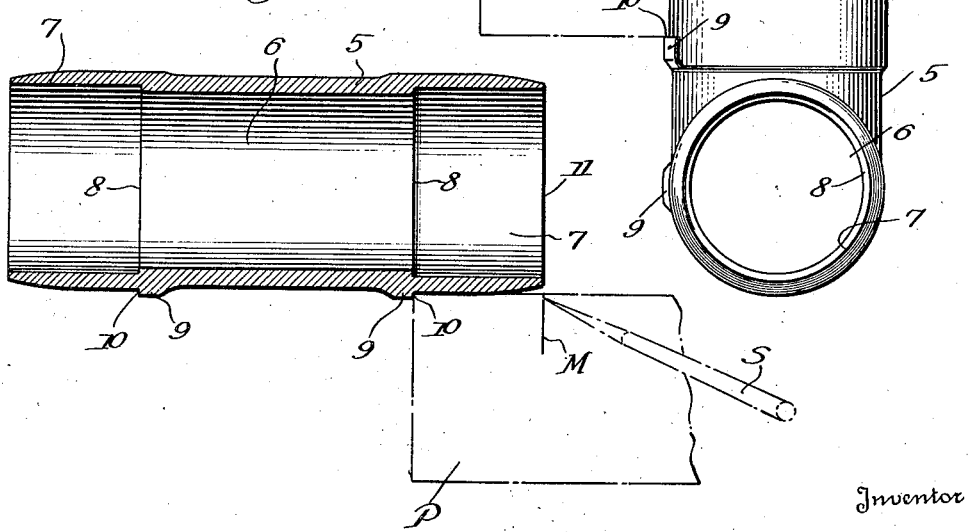
Inventor
Frank H. Mueller
By Cushman, Darby & Cushman
Attorneys

UNITED STATES PATENT OFFICE 1,996,346

PIPE OR ROD FITTING

Frank H. Mueller, Decatur, Ill., assignor to Mueller Co., Decatur, Ill., a corporation of Illinois Application June 2, 1933, Serial No. 674,091

1 Claim. (Cl. 285—111)

The present invention relates to pipe or rod fittings and, more particularly, to a pipe or rod fitting which is adapted to be sealed to a length of pipe or rod by means of solder or a similar fusible bonding material.

Pipe fittings or joints to which lengths of pipe are adapted to be sealed and connected by means of fusible bonding substances have long been used in plumbing and similar operations. Pipe fittings or joints adapted to be sealed to sections of pipe in this same manner and in which the solder is inserted in the fittings during their manufacture have come into wide use during recent years. In a pipe fitting of this particular type, the bore of the fitting is provided with a circumferentially extending recess or series of circumferentially extending recesses in which solder or fusible bonding material is inserted during the manufacture of the fitting, the bore of the fitting being also provided with a shoulder positioned inwardly of the solder. When a pipe is to be connected to the fitting, the end of the pipe is inserted in the bore of the fitting, positioned against the shoulder and heat is then applied to the exterior of the fitting to melt the solder in the recess of the bore of the fitting so that the solder will, when it again becomes hard, form a seal between the pipe fitting and the inserted end of the pipe.

In providing fittings of this type, the bore thereof is intended to have a close fit about the inserted pipe so that the melted solder will flow, by capillary attraction, between the wall of the bore of the pipe fitting and the exterior of the pipe. Because of the tight fit between the end of the pipe and the bore of the pipe fitting, plumbers frequently fail to insert the pipe into the bore of the pipe fitting a sufficient distance to have the end of the pipe in contact with the internal shoulder of the pipe fitting. This naturally reduces the length of the pipe within the fitting and causes a seal over a smaller area than is desirable.

The principal object of the present invention is to provide a pipe fitting which includes means on the exterior thereof to indicate the spacing or distance between the end of the pipe fitting and the internal shoulder in the bore of the fitting.

The provision of such a means, preferably in the form of a projecting abutment on the exterior of the pipe fitting, enables the plumber to place the end of a length of pipe to be connected to the fitting against the exterior of the fitting with the end thereof resting against the abutment. A mark may then be made upon the length of pipe at the point on the pipe corresponding to the end of the fitting. The length of pipe may then be inserted into the fitting, the mark scribed thereon serving to indicate whether the pipe has been inserted into the fitting a sufficient distance to contact with the internal shoulder of the fitting.

Other objects and advantages of the invention will be apparent from the following specification and drawing, wherein:

Figure 1 is a side elevation of a pipe fitting constructed in accordance with my invention, part of the wall of the fitting being broken away, Figure 2 is a longitudinal sectional view through the fitting taken on the line 2—2 of Figure 1, and Figure 3 is an end view of the fitting.

The numeral 5 designates a pipe fitting or joint of T construction illustrating the mode of application of my invention to a pipe fitting, it being understood that the invention may be applied to a pipe fitting or joint of any type.

The pipe fitting 5 includes the usual bore 6 and counter-bore 7 at each terminal or end of the fitting to provide an inwardly projecting shoulder 8 at a point spaced from the terminal of the fitting. It will be noted that recesses containing solder or other fusible substances may be provided in the circumferential wall of the counter-bored portion 7.

Abutments or lugs 9 are provided on the exterior wall of the pipe fitting 5 adjacent each terminal or end thereof, the face 10 of the abutment or lug closest to the corresponding terminal of the fitting being exactly aligned with the internal shoulder 8 of that end of the fitting. The abutments 9 are symmetrically formed, and, as shown, are preferably placed on one side of the fitting, so that they are readily accessible for the purpose for which they are intended. It will be noted that the contact face 10, against which the pipe end to be measured is seated, is of substantial and sufficient area, so that the end of the pipe P can be levelled against this plane surface 10 and properly aligned longitudinally with the fitting so as to insure a correct measurement and marking of the pipe.

By the above arrangement, the end of a pipe P which is to be inserted in the counter-bored portion 7 of the end 11 of the fitting, for example, is positioned against the exterior of the pipe fitting with its extreme end bearing upon the face 10 of the abutment or lug 9 as shown in Figures 2 and 3. A mark M may then be made upon the exterior wall of the length of pipe P by means of a scriber S or other suitable tool, the mark being made by using the adjacent terminal 11 of the fitting 5 as a guide. Thereafter, when the end of the pipe P is inserted in the counter-bored portion 7 of the end 11 of the fitting, the depth to which it must be inserted will be indicated by the mark M. By providing these positive stops exteriorly of the fitting, aligned with the abutment interiorly of the fitting, the workman can, with accuracy, determine and indicate the length of pipe which must be inserted in the fitting to bring the pipe end in proper relation to the internal abutment 8, so that when the parts are sealed and soldered by introducing the solder or sealing medium therein, a proper flow of solder and a complete sealing of the joint will be insured.

It will be understood that my invention may be used upon a pipe fitting which has been provided with solder or other fusible bonding material during its manufacture as well as with a pipe fitting which is intended to be supplied with solder or other fusible bonding substance during the operation of connecting it to a pipe section.

The invention is obviously applicable for use in connecting rods as well as pipes and the manner of its use in connecting rods will be obvious from the foregoing description.

It will be understood that the invention is not limited to the details of construction shown in the drawing and described in the specification and that the examples of the use of the device which have been given do not include all of the uses of which the device is capable; also, that the phraseology employed in the specification is for the purpose of description and not of limitation.

I claim:

A pipe fitting having a pipe-receiving counter-bore therein; an abutment at the inner end of the counter-bore to provide a positive pipe-stop for the end of a pipe inserted in the counter-bore, and a projection on the outside of the fitting having a stop-face in alignment with the face of the internal pipe stop adapted to be engaged by the end of a pipe, said external stop having a contact face of sufficient area to insure leveling and aligning the pipe and fitting, whereby determination of the proper portion of the pipe section to be inserted in the counter-bore may be facilitated.

FRANK H. MUELLER.